United States Patent Office 3,568,250
Patented Mar. 9, 1971

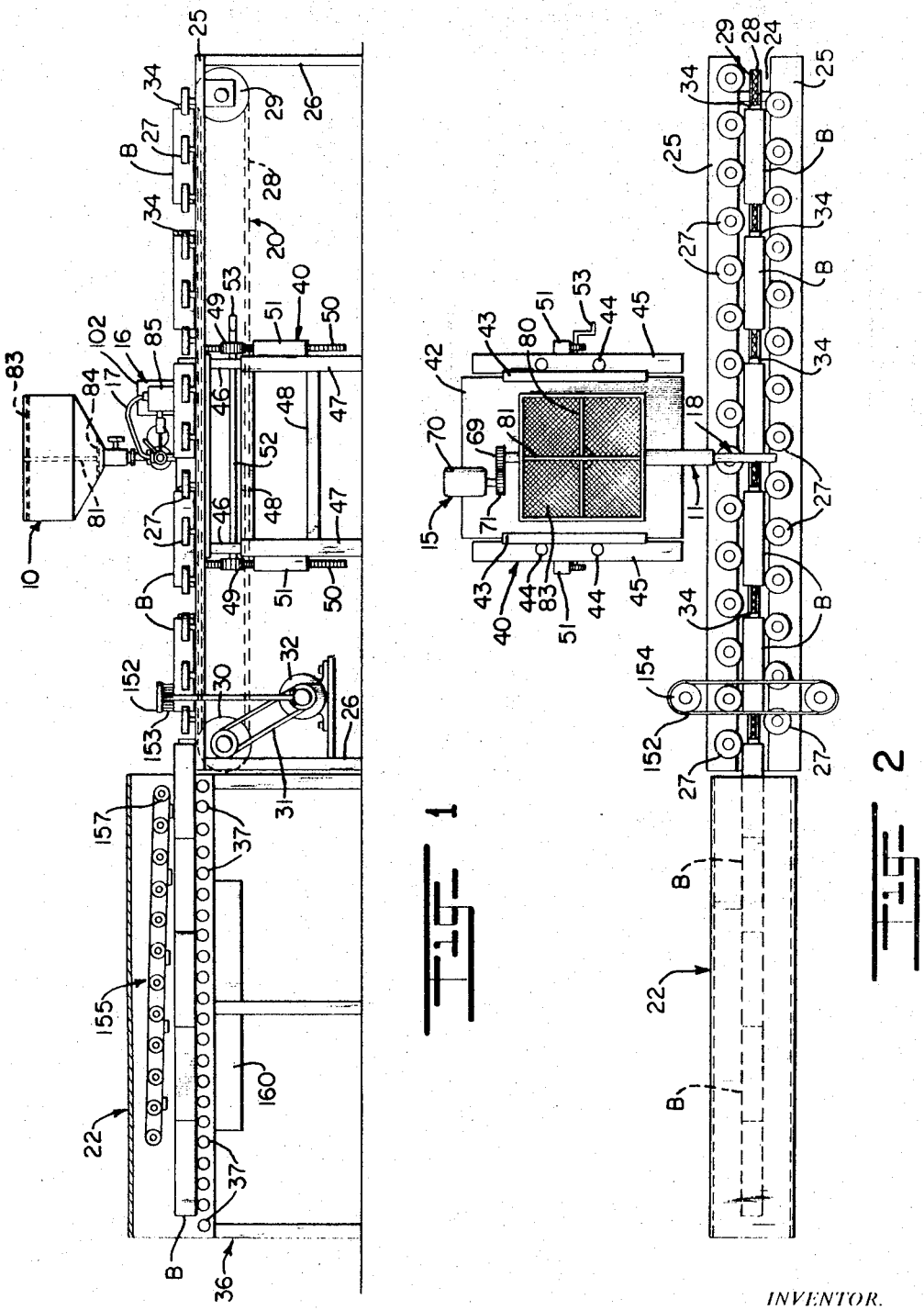

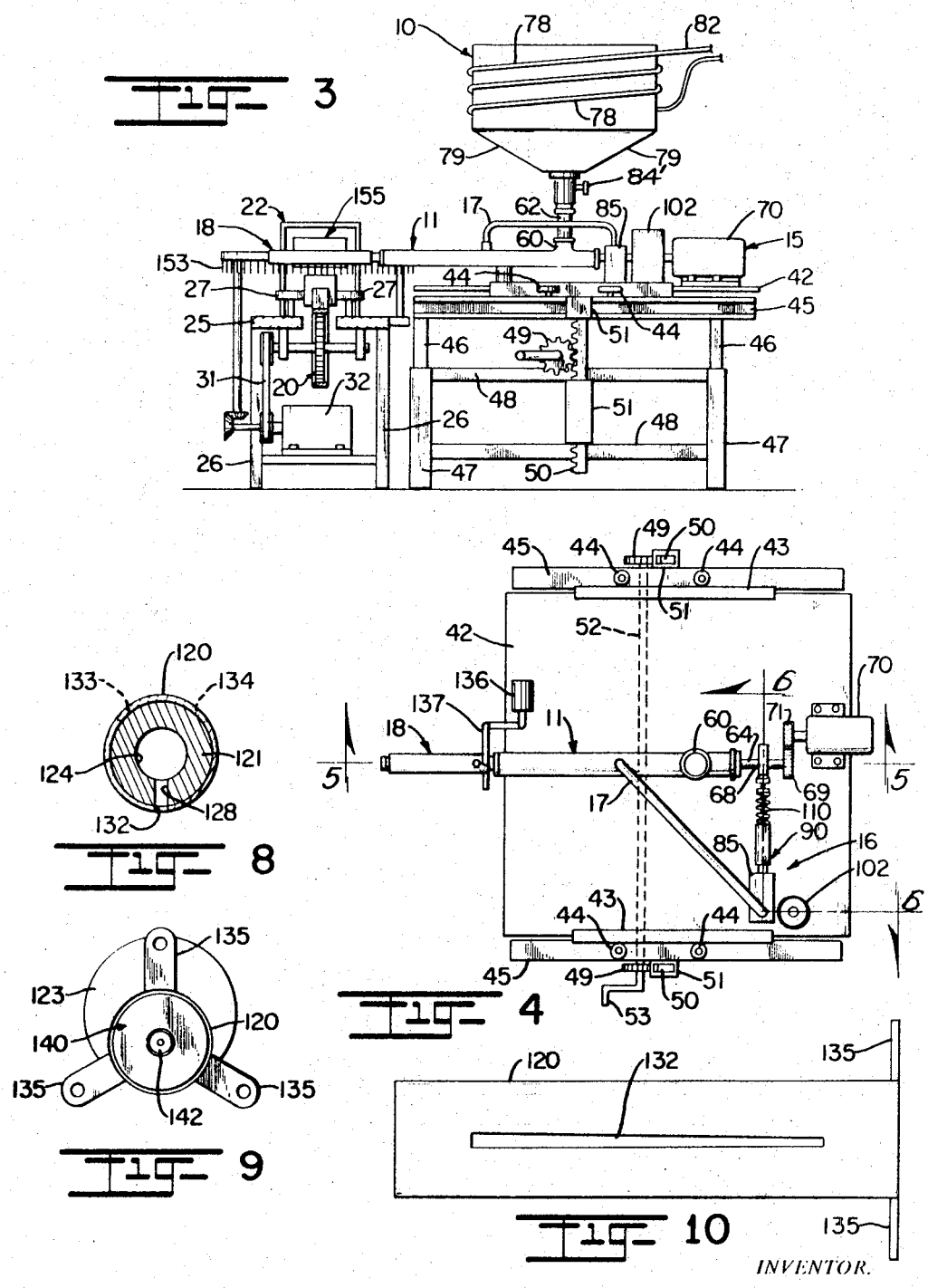

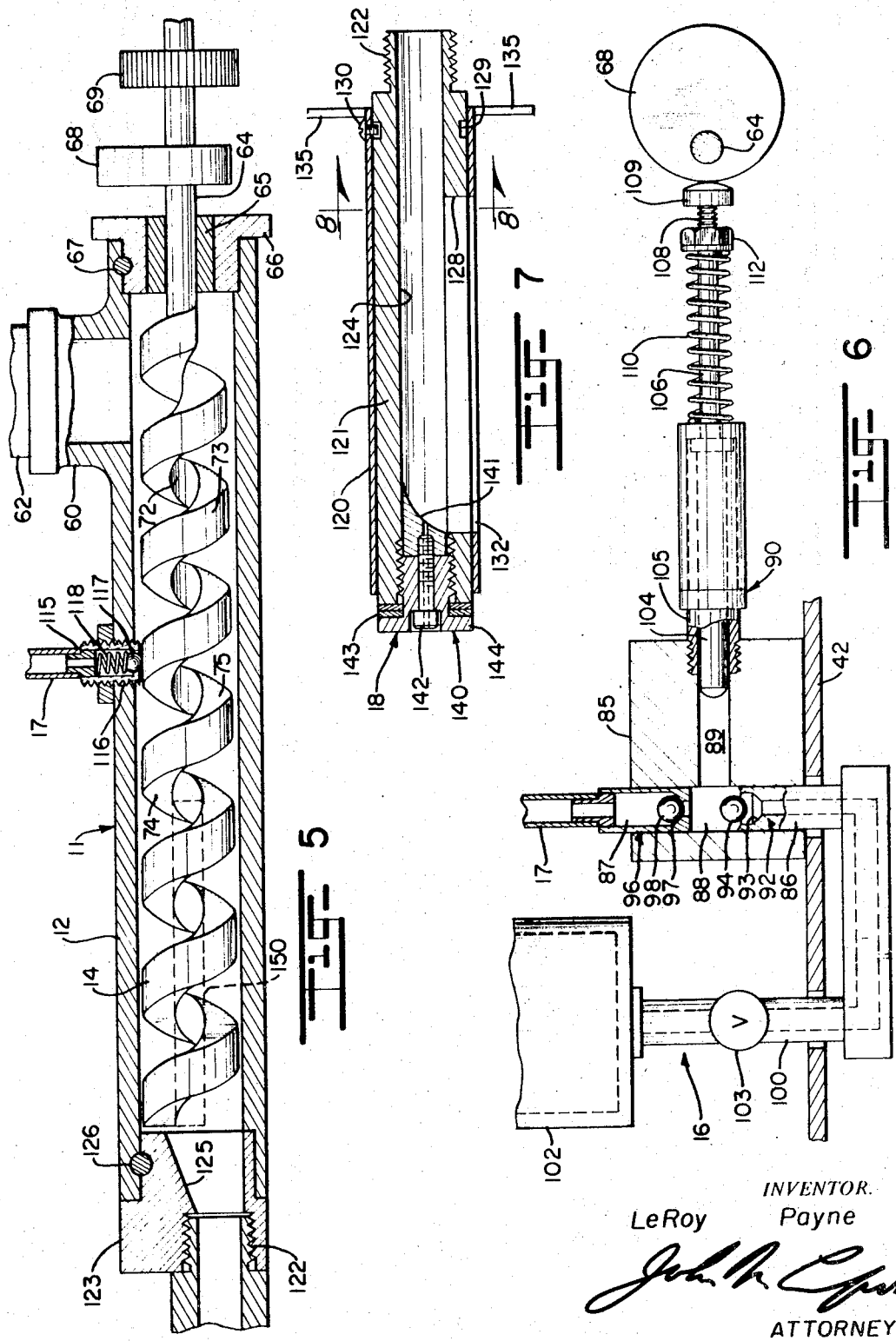

3,568,250
APPARATUS FOR EXTRUDING AND APPLYING PLASTIC MATERIALS
Le Roy Payne, Arvada, Colo., assignor to Weyerhaeuser Company, Tacoma, Wash.
Original application Sept. 10, 1965, Ser. No. 486,511, now Patent No. 3,469,281, dated Sept. 30, 1969. Divided and this application Apr. 28, 1969, Ser. No. 837,002
Int. Cl. B29d 7/04
U.S. Cl. 18—12                                                   3 Claims

ABSTRACT OF THE DISCLOSURE

An extruder apparatus for plastic materials having an elongated extrusion chamber on a hollow feed screw mounted within the chamber. Material enters one end of the chamber through a hopper and exits from the opposite end of the chamber. Additional material may be placed in the chamber through a check valve which is operated by the feed screw. The diameter of the feed screw is smaller than the diameter of the chamber at the entrance to the chamber and the feed screw increases in diameter toward the exit end of the chamber. The exit end has a discharge slot which is aligned in parallel relation to the longitudinal axis of the chamber. The slot increases in width in the direction away from the chamber.

CROSS REFERENCE TO RELATED APPLICATIONS

This is a division of application Ser. No. 486,511, filed Sept. 10, 1965, now U.S. Pat. No. 3,469,281, issued Sept. 30, 1969.

The present invention relates to the extrusion and application of viscous liquid or plastic materials; and, more particularly, relates to a novel and improved method and apparatus for rapidly and continuously mixing, extruding and applying curable plastic or liquefiable materials in uniform layers of predetermined width and thickness to relatively flat surfaces.

A number of the plastic materials can be advantageously used as protective and decorative coatings for surfaces, such as, for instance the floor and wall surfaces of a building, or as a coating layer for building blocks, masonry, tile and the like. For example, many of the thermosetting and thermoplastic materials are adaptable for use in this manner since by carefully controlling the relative proportions of the ingredients, accompanied by thorough mixing, the material may be applied in relatively thin layers or coatings onto the surfaces and will have the desirable characteristics of rapidly curing into a hard, tough surface layer. In large scale operations, however, and in order to effectively utilize such materials as surface coatings, means must be provided for continuously and thoroughly mixing and extruding the material under high pressure for application, either continuously or intermittently, in a uniformly thin layer onto the surface to be coated. In this relation, the means or apparatus provided should be capable of mixing and extruding materials of different viscosities as well as being accurately adjustable to closely control the proper proportions of the ingredients making up the materials according to their intended application and use. Moreover, since many of the plastic materials will tend to rapidly cure or set once mixed, the process should be carried out rapidly and continuously, and in such a way as to cover greater areas in the least possible time as well as to minimize further treatment or leveling of the materials following application. Again, in large scale operations it is desirable that the apparatus be of moderate size, lightweight and portable; and to enable positive cut-off between applications or coatings while being easy to service and maintain to permit rapid change-over to different materials.

Accordingly, it is an object of the present invention to provide for a novel and improveed method and apparatus conformable for use in coating surfaces with a thin layer of a synthetic resin or plastic material in a rapid, continuous manner, and in such a way that the apparatus can be advanced in relation to the surfaces or the surfaces can be advanced in relation to the apparatus for rapid, large-scale coating operations.

It is another object of the present invention to provide a novel and improved method and means for coating flat surfaces which will enable continuous formation and extrusion of plastic or liquefiable materials of different viscosities and properties including plastic-solid and solid formulations in a moderate sized apparatus for applications of predetermined width and thickness over large cross-sectional areas.

It is a further object of the present invention to provide an improved extruder apparatus being specifically adapted for use in coating surfaces with thermosetting and thermoplastic materials wherein the apparatus is compact, lightweight, versatile, time and labor-saving in use together with being easy to service and maintain, and wherein the apparatus has a new and useful feed screw and cylinder construction to bring about thorough mixing and extrusion of the material under gradually increasing pressure; and further, wherein the apparatus has a novel form of delivery pump for accurately injecting metered amounts of a catalyst or other agents and additives into the cylinder for admixture with the material, the delivery of the catalyst or other ingredient being closely controllable and automatically variable in accordance with the volume and rate of discharge of material from the apparatus.

It is still another object of the present invention to provide in an extrusion apparatus for a novel and improved form of extrusion die to effect discharge either continuously or intermittently of a narrow stream of a viscous liquid or plastic material, the die head being adjustable such that the length and width of the material discharged are independently variable over a wide range according to the desired width and thickness of coating; moreover, wherein the die will permit positive cut-off or periodic interruption of flow of the material for application at predetermined spaced intervals to a series of surfaces to be coated.

It is a still further object of the present invention to provide for a method of coating relatively flat surfaces of masonry construction, such as, building blocks, tile and the like in which the ingredients selected to comprise the coating material are continuously and automatically introduced in metered amounts for thorough mixing and extrusion under gradually increasing pressure and are discharged through a restricted delivery slot in the form of an elongated narrow stream onto the surface to be coated; and the method being further characterized by enabling periodic interruption and positive cut-off of the material passing through the control slot without interrupting the continuous mixing and extrusion of the material.

In accordance with a preferred embodiment of the present invention, an improved method and apparatus has been devised for coating surfaces with virtually any viscous liquid, molten or plastic material. The apparatus is characterized in particular by its ability to extrude heavily-filled plastic materials, for example, heavily-filled polyester resins containing 60 to 90 percent by weight reinforcing fillers together with minor amounts of a curing agent. In utilizing thermosetting materials, the resins and catalysts are automatically and closely controlled for delivery in proper proportions into an extruder, the latter being characterized by having an open screw for thoroughly mixing and simultaneously forcing the materials under increasing pressure to a die head. The relative amounts of resin, catalyst or other additives required can be metered and closely controlled so as to maintain the same relative proportions independently of changes in volume or flow capacity of materials through the extruder. The extrusion die in turn has a series of control slots of different widths which are variable in length according to the specified width and thickness of the surface coating. Furthermore, the slots are so formed as to discharge the material in a relatively thin layer of uniform thickness continuously along the surface to be coated.

Once applied to the surface, the coating composition may be treated further in a continuous manner prior to, or during, its cure to present various different surface textures and designs. Moreover, the discharge head and control slot may be controlled to establish rapid, periodic cut-off of the material without interrupting continued operation of the extruder so that the material will not harden or set within the apparatus. In this relation, the extruder will permit internal buildup and accumulation of the material over a limited time period when the coating operation is interrupted without increase in pressure within the extruder and in such a way as to minimize lag time or delay between stopping and starting the coating process.

The above and other objects, advantages and features of the present invention will become more readily understood and appreciated from a consideration of the following detailed description when taken together with the accompanying drawings, in which:

FIG. 1 is a side elevational view of a preferred form of apparatus for carrying out the method of the present invention.

FIG. 2 is a top plan view of the preferred form of apparatus shown in FIG. 1.

FIG. 3 is an end view, partially in section, of the preferred form of apparatus.

FIG. 4 is an enlarged top plan view in more detail of the extruder apparatus.

FIG. 5 is an enlarged sectional view taken on line 5—5 of FIG. 4.

FIG. 6 is an enlarged sectional view taken about line 6—6 of FIG. 4 and illustrating in more detail the preferred form of catalyst delivery pump.

FIG. 7 is a sectional view of the extrusion die.

FIG. 8 is a sectional view taken about line 8—8 of FIG. 7.

FIG. 9 is an end view of the die head; and

FIG. 10 is a bottom view of the outer sleeve portion of the discharge head.

Referring in detail to the drawings, the preferred form of apparatus is broadly comprised of a feed hopper 10 located at one end of an extruder apparatus 11 which includes an elongated cylinder 12 defining a cylindrical chamber for an auger or feed screw 14 which is mounted for rotation within the chamber by a suitable power source generally designated at 15. A catalyst delivery pump 16 has a supply line 17 projecting through the wall of the cylinder for communication with the chamber to admit a measured amount of catalyst for thorough mixing and extrusion with a resin material supplied by the feed hopper. Here the feed screw is operated to force the material under pressure through a discharge head or extrusion die 18 for deposition in a relatively thin layer of uniform width and thickness onto a flat surface being advanced beneath the die 18.

In the preferred form, the apparatus is illustrated for use in coating concrete building blocks B with a thin layer of a thermosetting material composed of a heavily-filled polyester resin and a minor amount of a catalyst or room temperature curing agent. As shown in FIGS. 1 to 3, the blocks B are advanced along a power conveyor 20 in lengthwise, spaced relation beneath the die 18, the latter being positioned to extend transversely above the path of advancement of the blocks for deposition of the resin material across the upper flat surface of each block. Thereafter, the blocks are advanced through a molding or curing unit 22 or other suitable treatment zone to be described; but of particular importance is the fact that the apparatus is capable of depositing a smooth even layer across the entire surface of each block as it is advanced beneath die. When necessary, the die 18 can be closed to effect rapid cut-off of the material between blocks without interrupting the continuous delivery and mixing of the material within the extruder.

Generally referring to FIGS. 1 and 2, it will be seen that the installation is elevated and specifically the power conveyor unit 20 is disposed for extension through a longitudinal guideway 24 in a table 25 supported on legs 26, and a series of horizontal guide rolls 27 are arranged in spaced parallel relation along opposite sides of the guideway to guide the blocks B therebetween. The conveyor unit has a sprocket chain 28 trained for advancement over a rear idler sprocket 29 and a front drive sprocket 30 driven by power transmission belt 31 off of a variable speed motor 32. In order to advance the blocks B along the conveyor, the chain 28 carries a series of dogs 34 at longitudinally spaced intervals, and the upper course of the sprocket chain travels parallel to and between the rolls 27 with the dogs 34 projecting upwardly to engage the end surfaces of the blocks and force them at a controlled rate of speed past the die 18 to the unit 22. Briefly, the unit 22 includes a supporting frame 36 for a series of guide rollers 37 arranged transversely of the frame, and the guide rollers 37 receive the blocks for advancement through a molding or curing operation to be described.

An important feature of the present invention resides in the extruder apparatus which is stationed on supporting frame 40 alongside the conveyor section 20 and in such relation that the die 18 traverses the width of the advancing blocks B in spaced relation above the conveyor platform 25. Of course the blocks B may vary in size and dimention and accordingly the supporting frame 40 for the extruder apparatus is both horizontally and vertically adjustable in order to facilitate alignment of the die in proper relation to the blocks. For this purpose, the frame 40 includes a flat bed 42 having tracks 43 being slidable along guide rollers 44 positioned on stationary side rails 45 for horizontal movement of the bed toward and away from the conveyor section 20. In turn, the entire supporting frame 40 including the bed 42 is adjustable in height and as best seen from FIGS. 3 and 4 this is suitably accomplished by supporting the four corners of the frame 40 on adjustable legs formed by telescoping upper and lower tubular sections 46 and 47 and with upper and lower horizontal braces 48 extending between the sections on opposite sides of the frame. Height adjusting pinions 49 are mounted on either side of the frame to engage vertical racks 50 slidably supported in housings 51 extending vertically between each pair of upper and lower braces 48, and the upper ends of the racks being affixed to the side rails 45. The pinions 49 are keyed to a common shaft 52 so as to be rotated in unison by an operating handle 53 on one of the pinions to advance the racks vertically in either direction and in this way to simultaneously adjust opposite sides of the frame upwardly or downwardly to the desired level.

Referring to FIG. 5, the cylinder 12 is relatively thick-walled and of uniform diameter throughout with an upwardly directed inlet port 60 at its rearward end communicating with the lower end 62 of the hopper 10. The feed screw 14 is mounted for rotation concentrically within the cylinder and has a drive shaft 64 extending rearwardly through a bushing 65 and outer concentric bearing 66 which is locked in position at the end of the cylinder by locking pin 67. Externally of the cylinder, the drive shaft includes an eccentric member 68 and a gear 69 both fixed for rotation with the shaft, and preferably the power source for the feed screw is defined by a variable speed motor 70 which through a pinion 71 at the end of the motor shaft intermeshes with the gear 69.

The feed screw 14 is characterized by being in the form of a relatively thick-walled, open spiral rib having inner and outer lands 72 and 73 with opposite parallel sides 74 and 75. As shown, the rib is of constant pitch and of progressively increasing external diameter from the rearward to the forward discharge end of the cylinder so that the clearance between the outer land 73 and the inner wall of the cylinder is increasingly reduced toward the discharge end as a result of which increased pressure is applied to the material as it is advanced toward the discharge end. As viewed in FIG. 5 from the rearward end of the cylinder the screw is rotated in a counter-clockwise direction and due to its open construction will permit free flow and uniform intermixing of the material as the material is advanced forwardly through the cylinder.

The gravity feed hopper 10 is generally rectangular in cross-section having upper vertical sides 78 and lower downwardly convergent sides 79 terminating in the reduced lower end 62 above the inlet port 60. As shown in FIG. 2, the hopper is divided into separate storage compartments by a pair of removable partitions 80 and 81 arranged in mutually perpendicular relation to one another and with the lower edges of the partitions terminating directly above the lower end 62. In this way, the base resin components, different color additives, or filler ingredients may be stored in separate compartments in the hopper for introduction in equal volumes into the extruder, and in passing through the lower end of the hopper will to some extent undergo preliminary mixing and combining prior to introduction into the extruder. As illustrated in FIG. 3, a heating coil 82 may be wrapped around the hopper to be employed in the event preliminary heating of the ingredients is required, and a heating element, not shown, may be employed on the extrusion cylinder to heat the materials as they are advanced toward the extrusion die for discharge. Also, as seen from FIGS. 1 and 2, removable filters or screens 83 and 84 are shown positioned across the upper and lower ends of the hopper 10 for sizing the material, and the delivery rate of material from the hopper into the extruder is controlled by a manually adjustable throttle or gate valve 84' positioned in the lower end 62 of the hopper unit.

Referring now to the delivery pump 16, it functions primarily to deliver metered amounts of a catalyst to the extruder, essentially in such a way that the amounts delivered are automatically controlled with respect to the rate of delivery of material from the hopper and with respect to the speed of rotation of the feed screw, and further such that the catalyst is isolated from the extrusion chamber until it is to be forced under pressure into the chamber. To this end, and as best seen from FIG. 6, the delivry pump has a valve body 85 positioned on the bed 42 in lateral spaced relation to the extruder 11. The valve body includes axially aligned inlet and outlet ports 86 and 87 communicating with a common metering chamber 88 and an internal groove 89 extends laterally from the chamber 88 to receive the inner end of a plunger assembly 90 which is interposed between the valve body and the eccentric 68, on the feed screw 14. An inlet check valve 92 in the inlet port 86 includes a valve seat 93 and a valve element 94; similarly, an outlet check valve 96 in the port 87 has a valve seat 97 and valve element 98. A controlled amount of catalyst is supplied to the chamber 88 through an inlet line 100 leading from supply tank 102, and a manual control valve 103 is positioned in the inlet line to regulate the amount delivered from the supply tank. It is to be noted that the tank is located above the level of the chamber 88 so that the pressure head of the tank is sufficient to force the catalyst into the chamber past the check valve 92 in preparation for each pressure stroke of the plunger in a manner now to be described.

The plunger assembly 90 includes a spring-biased plunger element 104 slidable through a sleeve 105 which is threadedly connected to the end of the groove 89, and the plunger element has a hollow extension rod 106 projecting outwardly from the sleeve 105 with a cam follower 108 being threadedly adjustable in the outer end of the rod 106. The enlarged end 109 of the follower is positioned in the path of travel of the eccentric member 68 so that the plunger 104 is advanced through the bore 89 and toward the metering chamber 88 in response to rotation of the feedscrew; and a return spring 110 is positioned on the extension rod and against the end of the sleeve 105 to bias the plunger and follower outwardly against the peripheral surface of the eccentric cam 68. The stroke length of the plunger is determined by adjusting the follower 108 and lock nut 112 so as to position the end portion 109 in desired relation to the eccentric member 68. Thus, rotation of the eccentric 68 from the position shown in FIG. 6 will force the plunger inwardly through the bore, overcoming the pressure of the spring 110, to force any catalyst within the chamber 88 outwardly through the outlet port 87 and into the supply line 17 leading to the extruder cylinder 12, and the inlet check valve 92 being forced to a closed position to block return flow through the inlet port. As the eccentric 68 is rotated away from the valve body, the plunger will follow its movement under the urging of the spring 110 thereby creating a negative pressure within the chamber to open the check valve 92 and induce the flow of material from the tank 102 into the chamber 88 for the next delivery cycle; and on the return stroke, the outlet check valve 96 is closed to block flow of material into the outlet line.

During each pressure stroke of the plunger the catalyst in the metering chamber is forced under pressure through the supply line 17. As shown, the distal end of the supply line 17 is connected to a valve body 115 in the wall of the extrusion chamber, and a valve element 116 is urged to a closed position against seating surface 117 at the inner terminal end of the body 115 by spring 118. In this relation, the valve element 116 projects inwardly a limited distance through the valve seat 117 and to an extent sufficient to be engaged and be depressed inwardly by the external surface or land 73 of the feed screw. Thus the supply line is normally closed to isolate the catalyst from the extrusion chamber, but in each cycle of revolution of the feed screw, the outer surface 73 will engage the valve 116 for a limited time interval to admit a controlled amount of catalyst forced under pressure by the plunger through the supply line into the extrusion chamber. In turn, the eccentric 68 is correlated with the feed screw 14 to advance the plunger through each pressure stroke and to force the catalyst into the supply line at the same time as the valve 116 is being forced open by the feed screw thereby to inject the catalyst under pressure directly into the extrusion chamber. As a result, once the delivery pump is properly adjusted through the control valve 103 and stroke setting of the plunger 104, a predetermined amount of catalyst is supplied through the supply line 17 for each revolution of the feed screw independently of the amount of resin material delivered by the hopper 10 to the chamber. Once present, however, to deliver a predetermined amount for each revolution of the feed screw, the amount delivered will vary proportionately with changes in the speed of rotation of the feed screw without further adjustment. In addition the feed screw will act as a wiper to remove any buildup of excess catalyst surrounding the valve to prevent clogging of the supply line or valve.

Turning now to the construction and arrangement of the extrusion die 18, it is positioned at the leading or discharge end of the extruder cylinder 12 to discharge the material in a layer of predetermined width and thickness onto each advancing block surface. Preferably, the head includes an outer rotatable housing defined by a relatively thin-walled sleeve 120 mounted in outer concentric relation to a stationary hollow valve body in the form of a relatively thick-walled tube 121 which is provided with a threaded end portion 122 for connection with an adaptor 123 at the leading end of the cylinder 12. The body 121 has an internal wall surface 124 of a diameter corresponding to the inner diameter of the adaptor 123, and in turn the adaptor includes an inwardly tapered surface 125 to form a smooth transition from the inner wall of the cylinder to the inner wall 124 of the valve body and is suitably locked in place at the discharge end of the cylinder by a locking pin 126.

To control discharge of material from the extruder, the valve body 121 is provided with an elongated, axially directed discharge opening 128 extending the greater length of the body, and an external peripheral groove 129 on the body receives the inner end of a screw member 130 projecting through the housing 120 to support the housing in outer concentric, journaled relation to the sleeve. In turn, the outer housing is provided with a series of control slots 132, 133 and 134 at equal circumferentially spaced intervals about the housing and outwardly projecting ears 135 are disposed at equally spaced intervals intermediately between the outer control slots 132 to 134. The outer control slots 132 to 134 generally correspond in length with that of the opening 128 in the body with each of the outer control slots being of a different width so that one of the outer control slots may be advanced into alignment with the control opening 128 to determine the thickness of the layer discharged from the head. In addition, the ears permit connection of a cut-off solenoid 136 having a control link 137 pivotally connected to one of the ears 135 so that by energizing the solenoid the link 137 will be withdrawn in a direction to rotate the outer control slot away from alignment with the discharge opening 128 thereby interrupting discharge of material through the slot. The outer end of the valve body 121 is closed by an adjustable plug member 140 which has an inwardly tapered, downwardly curved surface 141 secured to the inner end of the plug by a vented cap screw 142. Adjusting rings or shims 143 are positioned between the enlarged end 144 of the plug and the outer end of the body so that the extent of inward projection of the inner surface 141 across the opening 128 can be varied to establish the desired width of surface layer. For example, by removing one or more rings the plug 140 may be inserted a greater distance through the sleeve thereby advancing the end surface 141 inwardly and reducing the width of the stream passing through the control opening 128 and slot 132 onto each block. Furthermore, the curvature of the end surface 141 will prevent accumulation of material within the outer end of the block, and any accumulation of air or gas within the plastic material will be permitted to escape outwardly through the vented cap screw, in order to minimize the formation of bubbles in discharging the material from the die.

In order to discharge the material uniformly throughout the length of the outer control slot and assure application of a layer of uniform thickness, each of the control slots 132 to 134 is preferably of progressively increased width in a direction away from the extrusion chamber and in this way compensates for increased pressure of the material toward the inner end which would otherwise cause the material to flow at a faster rate and a greater thickness from the inner end than from the outer end of the slot, as illustrated in FIG. 10.

In the construction of the extruder apparatus, the rib or feed screw member 14 may either be of a constant or variable pitch, for instance, with the pitch of the feed screw being uniformly reduced toward the outlet end to impart an even greater pressure on the material for delivery into the discharge head. Moreover, a plug in the form of a rod member 150 of limited length, as shown dotted in FIG. 5, may be inserted in fixed relation within the leading end of the feed screw to impose greater pressure on the material advancing into the discharge head. This is of particular benefit in the extrusion of viscous materials to resist backflow from the extrusion die into the chamber. In this connection, it will be evident that the extruder apparatus of the present invention, particularly the feed screw and cylinder construction, would have useful application in various extrusion devices and operations, and for example may be used in combination with a variety of dies or discharge heads for extruding plastic materials into articles of different shapes. Furthermore, the apparatus of the present invention would have useful application in the extrusion and discharge of a variety of synthetic resins, plastic or other molten materials, either alone or where required to blend catalysts, plasticizers, pigments, fillers and other materials with the binding agent or resin to continuously produce a composition for molding or coating various different articles and surfaces, respectively.

Again the process or method of the present invention is best exemplified by reference to its use in the surfacing of concrete building blocks with a polyester resin compounded with a room temperature curing agent or catalyst. Here, a heavily-filled polyester resin is placed in the hopper 10 and the catalyst is placed in the supply tank 109. The conrtol valve 103 for the delivery pump is set along with the plunger stroke as described in order to deliver a metered amount of catalyst into the extruder whereby to effect a rapid cure of the resin when applied to the blocks. The die 18 is then accurately aligned over the conveyor 20 so that the blocks are advanced beneath the outer control slot and be traversed by the length of the discharge opening 128. Of course, the opening 128 may be adjusted in length by the valve plug 140 to correspond with the width of the block surfaces. At the same time, an outer control slot 132 to 134 is selected according to the desired thickness of the material and is aligned over the inner opening 128 prior to attachment of the cut-off control mechanism to one of the outer ears 135.

The apparatus is placed in operation by starting the feed screw motor drive 70 as well as the conveyor drive 32, and the speed setting for the conveyor is correlated with the feed screw speed setting to insure that the blocks are advanced beneath the die slot to receive an even or uniform layer of material without the layer either being draw out or squeezed together. In the apparatus as shown, the blocks B are advanced at equally spaced intervals between the dogs 34 and the cut-off solenoid 136 is synchronized to rotate the outer control slot from the open to closed position at the trailing end of each block, then to return the slot to the open position at the leading end of each next block in succession. The feed screw will continue to rotate during these cut-off periods to permit internal buildup or accumulation of material from the hopper and catalyst delivery pump in the extruder chamber; however, due to the open construction of the feed screw coupled with the increased clearance between the feed screw and chamber toward the inlet end, accumulation of the material is allowed without creating undue back pressure and without impeding continued delivery of material into the cylinder. In this way, the material is continuously mixed and agitated as it accumulates in the extruder preliminary to the next coating operation thereby to avoid hardening or setting of the material and to effect immediate discharge at the beginning of each operation. Alternately, it will be apparent that the blocks can be advanced in end-to-end abutting relation in which event periodic cut-off would not be required.

It is important in coating or surfacing operations of the type described that the amount of catalyst be closely metered or controlled in relation to the amount of resin delivered; also that the materials be throughly intermixed together with the catalyst uniformly dispersed throughout the resin, in order to establish optimum cure. An important feature in carrying out the method of the present invention is that to obtain an increase in the discharge rate of material, the hopper valve 84' is opened and the feed screw speed setting is increased to correspondingly increase the amount of catalyst delivered. This may be accurately determined since a predetermined amount of catalyst is delivered to the extruder chamber for each revolution of the feed screw, once the control valve 103 and plunger stroke is initially set. A greater range of adjustment of the catalyst pump is afforded, also, by independent adjustment of the pump with its inlet valve, plunger stroke and feed screw speed setting.

Various molding and surfacing operations may be performed on the surface layers, once applied to the blocks, during or immediately prior to cursing of the freshly applied material. For example an endless belt 152 fashioned with wire bristles 153 may be positioned on a pulley drive 154 just rearwardly of the discharge head. Here the belt drive may be operated off the conveyor drive to rotate the belt 152 transversely of the blocks to advance the bristles across the surface layers and to lend a striated appearance to the surface. In addition, an overhead conveyor belt drive 155 is illustrated for use in the molding unit 22, the belt being textured or otherwise provided with spaced, outwardly protruding designs, not shown, and mounted on a series of conveyor rollers 157 with the lower course contacting the blocks B. The belt is therefore advanced by frictional engagement with the blocks passing from the conveyor 20, and the weight of the belt will force it into the partially cured, surface layer on the blocks to impress a design therein. It will be noted that the upper belt conveyor is angled apart from the lower conveyor rolls 37 to assure separation of the belt from the cured surface layer toward the end of its travel trough the unit 22. In addition, heating coils 160 may be positioned beneath the lower conveyor rolls 37 and may be used where necessary to speed up the cure of the surface layer, for instance, in curing thermosetting materials.

While there is shown and described preferred and alternate forms of the present invention, it is to be understood that various changes and modifications may be made in the combination, construction and arrangement of parts comprising the present invention as well as in the exact sequence of steps followed in practicing the method of the present invention without departing from the spirit and scope thereof, as described by the appended claims and any reasonable equivalents thereof.

What is claimed is:

1. An extruder apparatus being adapted for use in extruding and applying thin layers of a viscous liquid material to a series of articles being advanced in longitudinally spaced, end-to-end relation along a predetermined path of travel, said apparatus comprising in combination an extruder including an elongated extrusion chamber and hollow feed screw mounted for rotation within the chamber having drive means for driving said feed screw at a predetermined rate of speed, delivery means for introducing material into the chamber for extrusion and advancement therethrough, an extrusion die at one end of the chamber including at least one discharge slot being aligned transversely above the path of advancement of the articles, and cut-off means associated with said extrusion die and being synchronized with the rate of advancement of the articles to periodically interrupt the discharge of material from the discharge slot at timed intervals between the advancement of the articles while continuously rotating said feed screw and delivering material into the extrusion chamber, said discharge slot being aligned in parallel relation to the longitudinal axis of the chamber and being in the form of an elongated narrow opening progressively increasing in width in a direction away from the chamber.

2. An extruder apparatus being adapted for use in extruding and applying thin layers of a viscous liquid material to a series of articles being advanced in longitudinally spaced, end-to-end relation along a predetermined path of travel, said apparatus comprising in combination an extruder including an elongated extrusion chamber and hollow feed screw mounted for rotation within the chamber having drive means for driving said feed screw at a predetermined rate of speed, delivery means for introducing material into the chamber for extrusion and advancement therethrough, an extrusion die at one end of the chamber including at least one discharge slot being aligned transversely above the path of advancement of the articles, and cut-off means associated with said extrusion die and being synchronized with the rate of advancement of the articles to periodically interrupt the discharge of material from the discharge slot at timed intervals between the advancement of the articles while continuously rotating said feed screw and delivering material into the extrusion chamber, said extrusion die being characterized by including a valve body with a control opening therein and a series of discharge slots selectively movable into alignment with the control opening for discharge of material therefrom.

3. In an extruder apparatus, an elongated hollow cylinder defining a cylindrical chamber of uniform diameter having an inlet for the introduction of material adjacent to one end of the chamber and an extrusion die positioned at the opposite discharge end of the chamber, a feed screw in the form of an open spiral rib being disposed for rotation within said chamber between the inlet and the discharge end, said rib having an external surface increasing in diameter toward the discharge end of said chamber to form a progressively reduced annular clearance space between the external surface of said rib and the cylindrical chamber, and a plug being positioned concentrically within said rib adjacent to the discharge end of said chamber to restrict backflow of material rearwardly from said extrusion die into the chamber.

References Cited

UNITED STATES PATENTS

| 1,547,260 | 7/1925 | Nighthart | 25—103 |
| 2,012,031 | 8/1935 | Woodruff | 222—309 |
| 2,205,875 | 6/1940 | Coffey | 222—309 |
| 2,369,359 | 2/1945 | MacWilliam | 18—12 |
| 2,504,205 | 4/1950 | King | 25—1 |
| 2,588,595 | 3/1932 | Warner | 25—1 |
| 2,679,215 | 5/1954 | Truejoell | 18—4 |
| 2,747,224 | 5/1956 | Kock | 18—2 |
| 2,826,492 | 3/1958 | Morash | 18—12 |
| 2,982,995 | 5/1961 | Groleau | 18—12 |
| 3,051,455 | 8/1962 | Magester | 18—12 |
| 3,135,019 | 6/1964 | Aichele. | |
| 3,195,781 | 7/1965 | Egleston | 222—559X |
| 3,197,814 | 8/1965 | Bond | 18—12 |
| 3,207,378 | 9/1965 | Trumbull | 222—134 |

FOREIGN PATENTS 1,003,469   11/1951   France.

J. SPENCER OVERHOLSER, Primary Examiner

B. D. TOBOR, Assistant Examiner

U.S. Cl. X.R.

18—4